United States Patent Office 2,747,224
Patented May 29, 1956

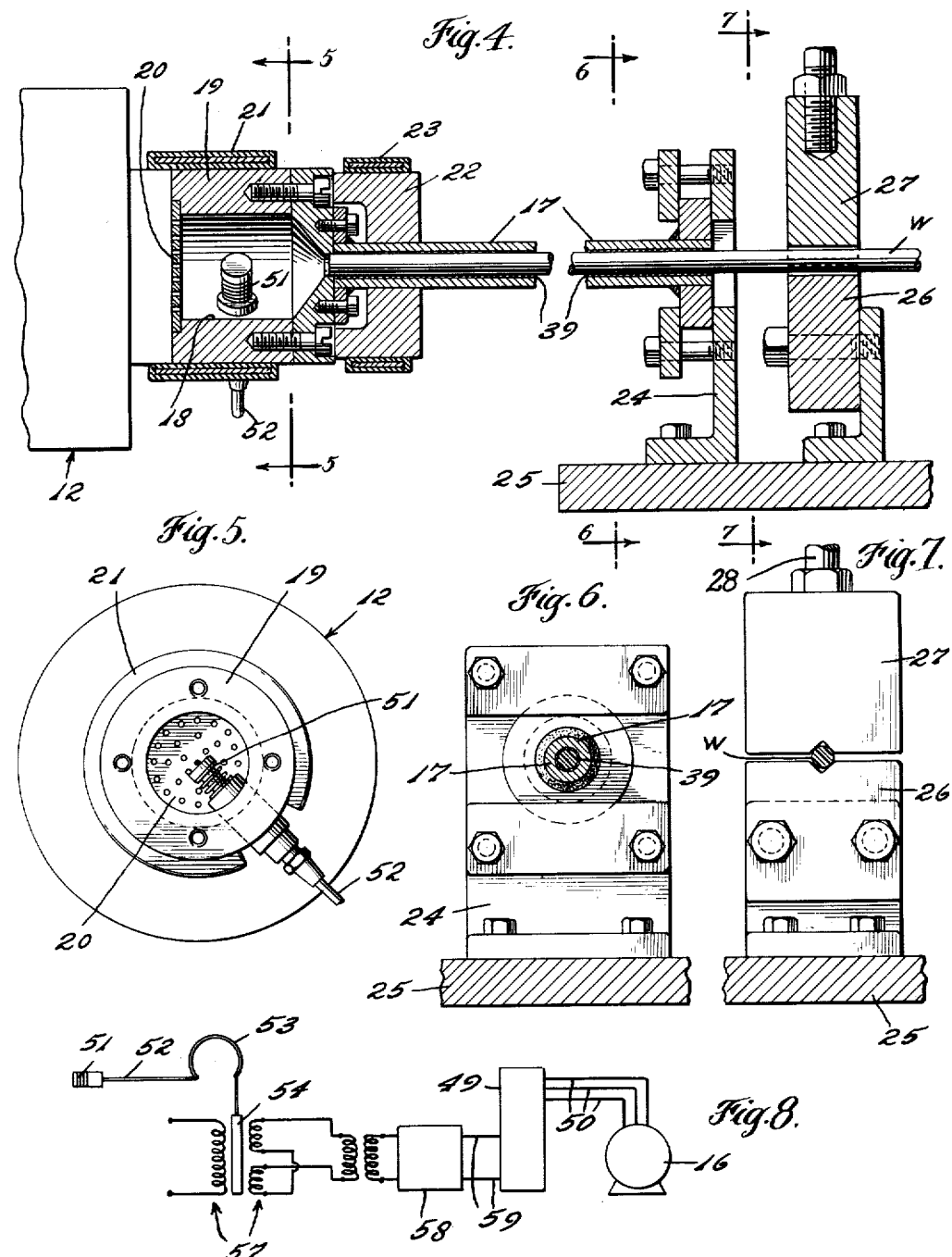

2,747,224
METHOD AND APPARATUS FOR CONTINUOUSLY FORMING ELONGATED SHAPES FROM THERMOPLASTIC MATERIALS

Robert B. Koch and Ralph E. James, Jr., Reading, Pa., assignors to The Polymer Corporation, Reading, Pa., a corporation of Pennsylvania Application August 6, 1952, Serial No. 302,969

16 Claims. (Cl. 18—14)

This invention relates to method and apparatus for continuously forming elongated shapes such as rod stock or tubing from thermoplastic materials.

One of the principal objects of the invention is to improve the uniformity of continuously formed elongated shapes, especially with reference to the internal structure thereof and also with reference to the cross sectional shape and dimensions, freedom from porosity, etc.

Various aspects of the invention are concerned with that general type of operation and equipment for continuously making elongated shapes according to which a pressure feed mechanism, for instance of the screw or gear type, is utilized to force softened plastic material through an internal passage in a forming device adapted to impart the desired shape to the material being fed. In most equipment of this kind a screw feed device is utilized not only for the purpose of developing the required pressure to force the softened plastic material through the forming device but also as a means for softening the plastic material, the barrel of the screw feed mechanism being provided with heater elements for supplying the heat required for softening purposes.

In systems of the general kind referred to above the pressure of feed of the softened material tends to vary, the variations resulting from several causes including irregular action of the pressure feed mechanism and tendency for the plastic material to move through the forming device more or less erratically. Such pressure variations in turn result in variations in internal structure of the piece being formed, for instance the density thereof. Pressure variations also cause variations in the cross sectional shape or size of the elongated piece being formed, and in cases where the pressure drops excessively interior porosity may occur.

With the foregoing in mind, one of the broader aspects of the invention contemplates the provision of a pressure control system according to which the speed of operation of the screw of the feed mechanism is regulated in accordance with the pressure of the softened plastic material at or just beyond the delivery end of the screw. Specifically, the invention provides for decreasing the screw speed when the pressure of the softened plastic material exceeds a median value and for increasing the screw speed when the pressure of the material falls below said median value. This tends to overcome pressure changes in the softened plastic material regardless of the cause thereof.

The important feature mentioned just above is of especial advantage in a system of the general kind referred to further characterized by the employment of a forming device of special kind, i. e., a forming device having a relatively long forming passage therein provided with cooling mechanism operative to completely or substantially completely solidify the material being forced through the forming device prior to its delivery therefrom. In such an arrangement the rate of feed or advancement of the solidifying material in the forming device is apt to be more or less erratic, and the control mechanism for regulating the speed of the feed screw is therefore of especial utility in this situation.

In the type of arrangement where the forming device has a relatively long forming passage therein and where the material is substantially completely solidified during passage through the forming device, the invention contemplates employment of another controlling mechanism in the form of a delivery control mechanism engaging the solidified shape beyond the discharge end of the forming tube and driven at a constant rate so as to provide for a constant rate of delivery of the solidified shape from the forming device. In a typical equipment the delivery feed mechanism appropriately comprises a pair of driven rolls in frictional engagement with the solidified piece beyond the discharge end of the forming tube or other forming device.

In connection with the aspect of the invention just mentioned, it is here pointed out that the present application is in the nature of a continuation-in-part of our copending application Serial No. 230,912, filed June 11, 1951.

Although the invention is not limited thereto, it is still further of especial utility in the formation of elongated shapes from thermoplastic materials which are liquid or substantially liquid in the molten state, especially the high melting polyamides such as polyhexamethylene adipamide, polyhexamethylene sebacamide and polymerized epsilon aminocaproic acid (caprolactam).

The use of an elongated forming device with cooling mechanism providing for sufficient cooling to solidify the material prior to delivery from the forming device further increases the tendency for the pressure of the softened plastic material to vary at the input end of the forming device, since movement of the solidified or partially solidified shape through the forming device tends to be somewhat erratic. However, in the system contemplated by the invention incorporating not only the feed pressure control feature but also the delivery rolls or equivalent feed mechanism beyond the discharge end of the forming tube, elongated shapes of substantially uniform structure and dimensions can readily be formed continuously, notwithstanding the increased tendency for the input feed pressure to vary.

How the foregoing and other objects and advantages are attained will appear more fully from the following description referring to the accompanying drawings, in which—

Figure 4 is an enlarged vertical sectional view of certain portions of the equipment shown in Figures 1, 2 and 3, especially illustrating portions of the forming tube and of the pressure control system associated with the input end;

Figure 1:
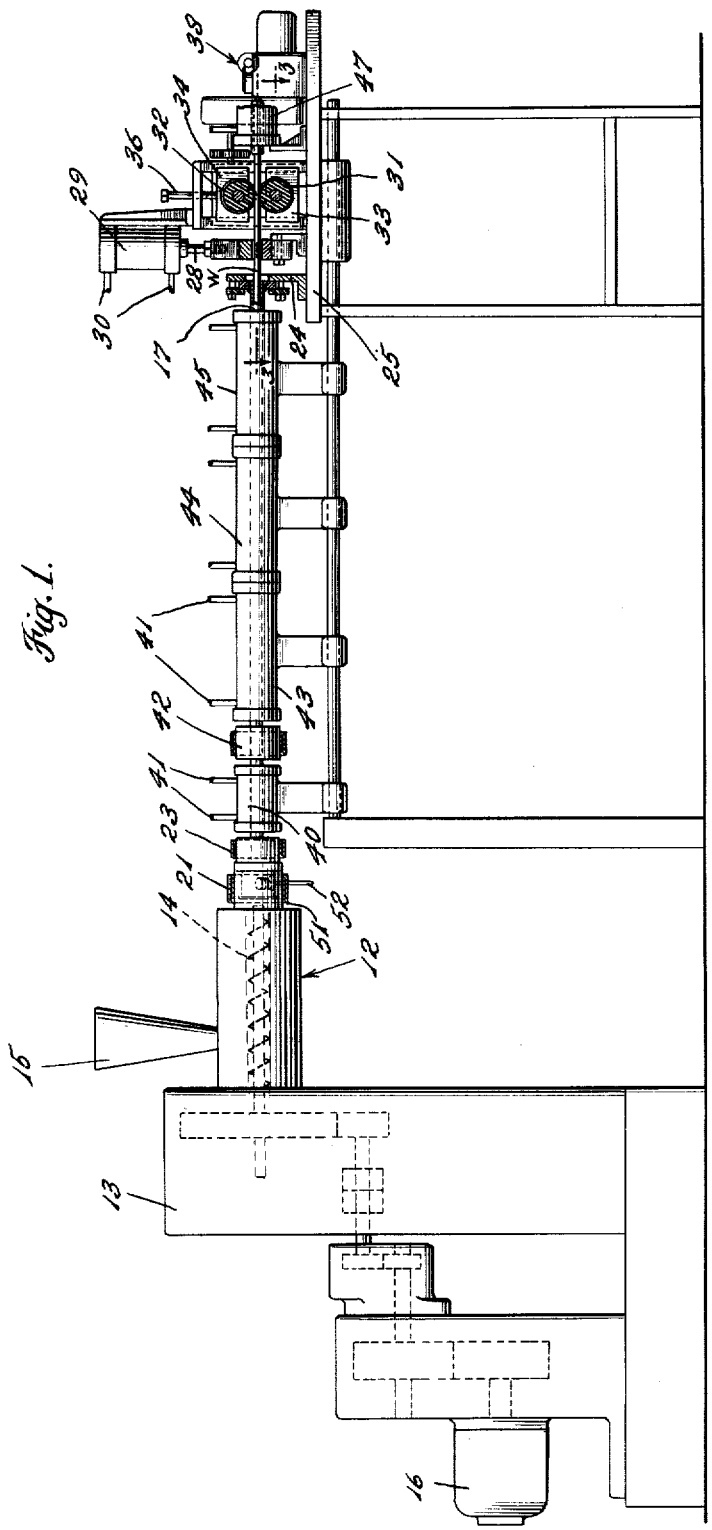
Figure 1 is a side elevational view of equipment incorporating the features of the present invention, certain parts being broken away and shown in section for the sake of clarity, and other parts here being shown only in outline for the same purpose.
Figure 9:
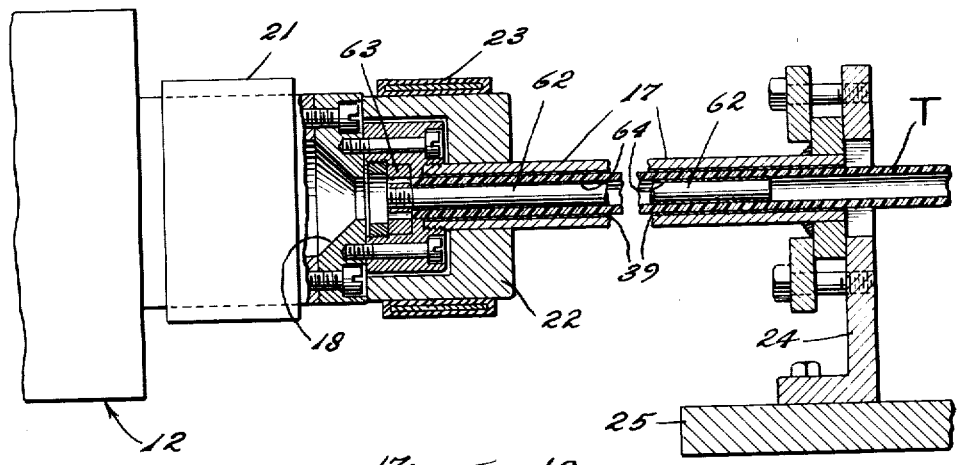
Figure 10:
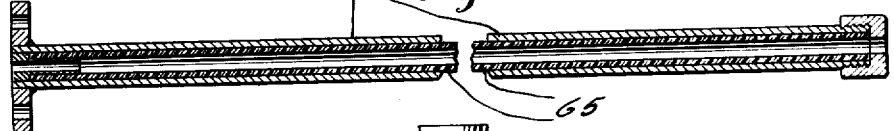
Figure 11:
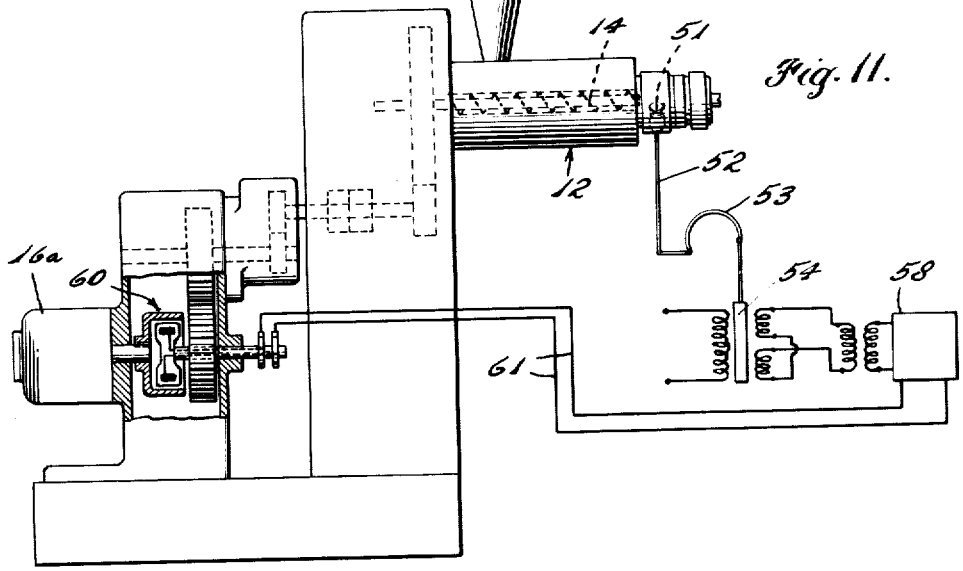

Figures 5, 6 and 7 are transverse sectional views taken respectively as indicated by the section lines 5—5, 6—6 and 7—7 on Figure 4;

Figure 8 is a simplified diagrammatic view of the control system included in the embodiment of the invention shown in Figures 1 to 7 inclusive;

Figure 9 is a view similar to Figure 4 but illustrating another embodiment of the invention, particularly adapted to the formation of tubing;

Figure 10 is a partial longitudinal sectional view of an alternative forming tube adapted for use either in the embodiment of Figures 1 to 8 inclusive, or in the embodiment of Figure 9; and Figure 11 is a view showing certain portions of the equipment in the general manner of Figure 1, with a modified form of control system applied thereto.

In considering the drawings reference is first made to the embodiment of Figures 1 to 8 inclusive.

The screw feed device is generally indicated at 12 in Figure 1, this device being supported on a standard 13 which may serve to house certain of the drive mechanism. In the embodiment of Figure 1 the screw feed device comprises a barrel in which the screw 14 is adapted to rotate, the barrel being provided with an inlet opening through which the material to be used is introduced, as through a funnel 15, in known manner. The barrel of the screw feed device is preferably surrounded with a heating jacket, so that plastic material, usually in granular form will be softened and plasticized as it is advanced by the screw.

Figure 2:
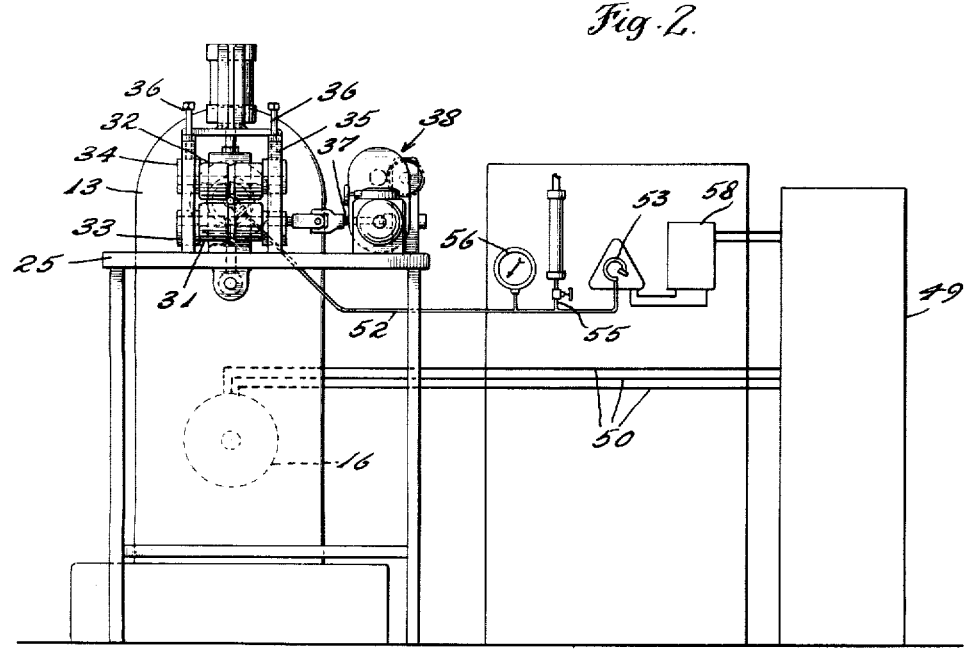
Figure 2 is a view of the equipment shown in Figure 1 taken from the right hand end of Figure 1.
Figure 3:
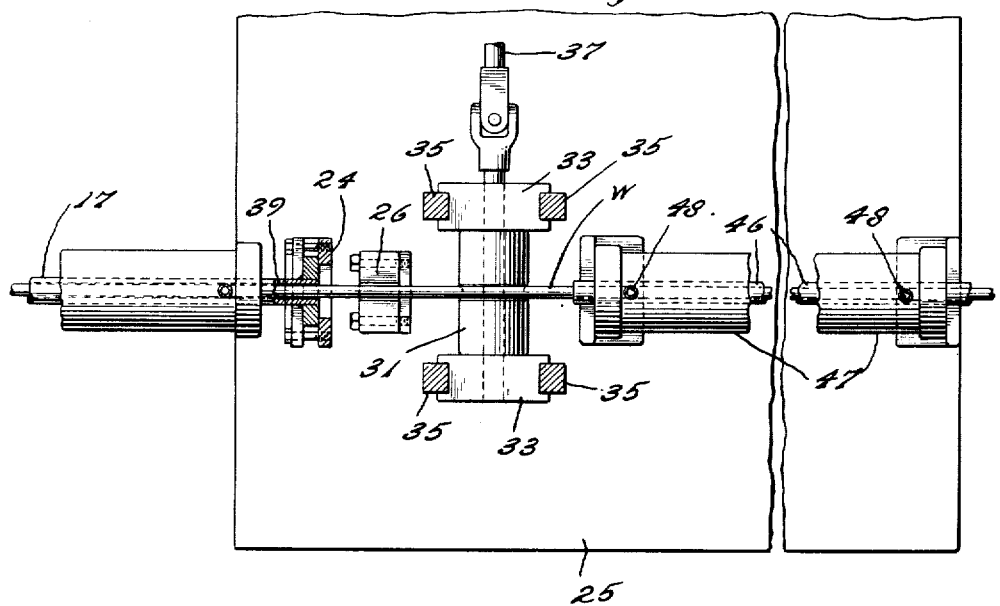
Figure 3 is a horizontal sectional view on an enlarged scale taken as indicated by the section line 3—3 on Figure 1.

As shown in Figures 1, 2 and 8, the screw 14 is adapted to be driven by a motor 16, the motor shaft being connected with the screw shaft by means of suitable gearing, preferably including reduction gearing. Since these drive parts form no part of the present invention per se they need not be described in detail herein. However, it may here be mentioned that motor 16 is a variable speed motor and forms a part of the pressure control system to be described hereinafter.

As seen in Figures 1 to 5, in this embodiment of the equipment, the forming device comprises an elongated forming tube 17 having its inlet end associated with a chamber 18 formed within a head or fitting 19 arranged in the delivery end of the screw feed device 12. A perforated element or breaker plate 20 permits passage of the softened plastic material from the screw feed device proper into the chamber 18, from which the softened material is forced into the inlet end of the forming tube. A heater element 21 surrounds the head 19 so as to retain the material being fed in softened condition as it is being delivered through the chamber 18. The inlet end of the forming tube is also desirably supplied with head through a block 22 surrounded by a heater 23.

The delivery or discharge end of the forming tube 17 is supported in any suitable manner as by a bracket 24 mounted on a table 25, as appears to best advantage in Figures 4 and 6.

Also mounted on table 25 is a friction clamp brake comprising a lower fixed element 26 and an upper adjustable element 27 having appropriately notched or otherwise recessed faces adapted to frictionally engage the elongated shape being formed, in this instance the round rod W. The upper brake block 27 is connected with the piston rod 28 of a piston (not shown) working in cylinder 29, to and from which operating fluid, for instance air under pressure, may be introduced and exhausted as by pipe connections 30. This provides for control of the pressure of engagement of the brake blocks 26 and 27 with the rod being formed, the purpose of this brake being explained more fully hereinafter.

Beyond the brake blocks 26—27 a pair of grooved friction feed rolls 31 and 32 are arranged to engage the work piece W. These two feed rolls are mounted for rotation in pairs of journal blocks 33 and 34 which are vertically adjustable between pairs of upright guides 35. The journal blocks 33 for the lower roll 31 are preferably fixed in an adjusted position appropriate to receive the rod W, and the blocks 34 are forced downwardly as by the adjusting screws 36, so as to tightly grip the rod W between the pair of rolls 31 and 32.

One or both of the feed rolls (the lower one in this particular embodiment) are driven, as by the drive shaft 37 which is connected with a drive motor unit (incorporating reduction gearing) generally indicated at 38.

In operation the feed rolls 31 and 32 are driven at constant speed, which speed may, however, be adjusted to different values, according to the particular operating conditions prevailing.

The forming tube desirably has a slippery internal lining preferably comprising polytetrafluoroethylene. As here shown this lining takes the form of a coating 39 directly bonded to the interior surface of the tube 17 in the embodiment of Figures 1 to 8 inclusive. A lining of this kind in the forming tube forms no part of the present invention per se, being described and claimed in copending application of William J. Davis and Robert B. Koch, Serial No. 288,598, filed May 19, 1952, issued February 28, 1956, as Patent No. 2,736,057, and assigned to the assignee of the present application.

The forming tube 17 is provided with a number of jackets for regulating the temperature of different zones thereof. Thus, a cooling jacket 40 is provided just beyond the entrance end of the forming tube, this jacket being provided with connections 41 providing for the circulation of a cooling medium therethrough. A reheater block 42 surrounds the forming tube just beyond the cooling jacket 40. Beyond the reheater block is a series of additional cooling jackets 43, 44 and 45, each one of which is provided with connections 41 for the circulation of a cooling medium therethrough. Ordinarily the temperature maintained in the jackets 43, 44 and 45 would be progressively lower, so as to progressively subject the rod being formed to lower temperatures as it is advanced through the forming tube. The specific arrangement of the temperature controlling devices 40, 42, 43 and 45 forms no part of the present invention per se, being described and claimed in the copending application Serial No. 288,598, fully identified above.

Beyond the feed rolls 31—32, the solidified piece W passes through an elongated loosely fitting tube 46 which is surrounded by a temperature controlling jacket 47. This jacket may be supplied with a heat transfer medium as by means of connections 48. The jacket 47 may serve to subject the solidified piece to what is in effect an annealing operation, to relieve strains.

Attention is now called to the pressure control system of the present invention, various parts of which are best seen in Figures 2, 4, 5 and 8.

On this subject it is first pointed out that the motor 16 in the embodiment of Figures 1 to 8 is a variable speed motor, the motor windings being coupled with a control unit indicated diagrammatically at 49 in Figures 2 and 8, as by the conductors 50. The details of the motor control unit and, indeed, of certain other controls utilized in the system of the invention need not be considered herein, and are shown only diagrammatically as they form no part of the present invention per se.

The controlling impulse for the pressure control system originates in a pressure responsive device, such as a pressure responsive bellows 51 located in chamber 18 at the discharge end of the screw feed device 12. A fluid pressure connection 52 extends from the bellows 51 to a Bourdon tube 53 arranged to shift the armature 54 according to the pressure within the elements 51, 52 and 53. This pressure system may be supplied with an appropriate operating liquid, such as oil, through a valved connection 55 (see Figure 2). A pressure gauge 56 may also be associated with the connection 52.

With the arrangement of parts just described, changes in pressure of the softened plastic material in the chamber 18 will produce changes in pressure in the bellows 51 and thus in the Bourdon tube 53 resulting in flexing of the Bourdon tube, and by this action the armature 54 will be shifted with relation to the associated control windings 57 (see Figure 8). Certain of the windings 57 are electrically connected with a control circuit diagrammatically indicated at 58 which, in turn, is coupled with the motor control unit 49 as by connections 59.

In operation, the thermoplastic material in solid form, usually in flake or granular form is fed to the screw feed device 12 through the feed hopper 15, and during advancement through the barrel of the feed device under the action of the screw 14, the heating jacket surrounding the barrel serves to soften the material, so that the feed screw delivers a stream of softened material into the chamber 18, from which the material enters the forming tube 17. When the pressure of the softened thermoplastic material in the chamber 18 tends to rise above a median value, the resultant increase in pressure in the bellows 51 and in the Bourdon tube 53 causes a movement of the armature 54. The control circuits respond to this movement of the armature in a manner to decrease the rate of operation of the motor 16 and therefore to decrease the rate of drive of the feed screw 14. This will cause the pressure in the chamber 18 to return again to the median value.

Similarly, in the event of a drop in pressure of the softened material in the chamber 18, the pressure control system is actuated to increase the rate of drive of the feed screw 14, so as to return the pressure to the median value. It will be understood that the control system is capable of adjustment, so as to vary the median value above and below which pressure changes will occur. Such adjustment will, of course, be required, depending upon the particular operating conditions such, for example, as the diameter or cross sectional area of the elongated piece being formed, and also on the particular thermoplastic material being used.

The foregoing pressure control system is of advantage in any continuous operation of this general kind, so as to provide substantial uniformity of pressure at the input side of the die or forming device, but the system is of especial advantage when used with the kind of equipment in which the piece being formed is actually solidified in the forming device and in which a feed mechanism, such as rolls 31—32, is arranged to engage the solidified piece beyond the forming device and is driven at constant speed, so as to provide for uniform rate of delivery of the solidified piece from the forming tube or other forming device.

When employing both the constant speed delivery feed and the constant pressure input feed, an unusually high degree of uniformity is attainable, even with various of the polyamide or nylon materials which are liquid in the molten condition.

A modified form of the pressure control system is illustrated in Figure 11. In this arrangement a motor 16a of the constant speed type is utilized, this motor being connected to drive the screw 14 through an adjustable clutch generally indicated at 60. Any of a number of adjustable clutches may be employed for this purpose, for instance a magnetic clutch of the known type adapted to vary the torque transmissible by regulation of the current flowing through the windings of the rotor or armature. This latter is the general type of clutch somewhat diagrammatically indicated in Figure 11.

When employing a constant speed motor and a variable clutch, as in Figure 11, the control circuits 58 are connected with the windings of the clutch armature, as by leads 61. Other elements of the control system are the same as described above in connection with the first embodiment, including the bellows 51 and the Bourdon tube 53, which latter is associated with the movable armature 54.

In the system of Figure 11 when the pressure of the softened thermoplastic material rises above a median value the control system operates to decrease the torque transmissible through the clutch 60, and similarly, when the pressure of the softened thermoplastic material falls below said median value the control system operates to increase the torque transmissible through the clutch 60. Here again the control system acts to establish and maintain a substantially constant pressure of feed of the softened material to the forming tube or other forming devices.

Turning now to the modification illustrated in Figure 9, it is assumed that the general arrangement of the equipment shown therein is the same as that of Figures 1 to 8 inclusive. In Figure 9, however, the forming device is modified to provide for the formation of a tube T, rather than a solid rod. For this purpose a mandrel 62 is arranged centrally within the forming tube 17, this mandrel being anchored, as by threading, in a perforated member 63, the perforations of which provide for delivery of the softened plastic material from the chamber 18 into the annular space between the mandrel and the forming tube 17. As before, the forming tube 17 is preferably provided with a lining 39 of polytetrafluoroethylene and, in addition, a similar slippery coating is preferably applied to the exterior surface of the mandrel 62, as is indicated at 64.

The pressure control system as described above in connection with Figures 1 to 8 and 11 is also contemplated for use in an arrangement such as shown in Figure 9 where tubing is being made. The positive feed mechanism at the delivery end of the system, such as the feed rolls 31—32 may also be used, except in cases where the tube wall is very thin. Employment of grooves in the feed rolls 31—32 shaped to accurately fit the exterior of the tube being formed enables use of such feed rolls even on relatively thin walled tubing.

As hereinabove indicated, the pressure control system of the present invention is applicable to equipment of a variety of types, employing a variety of forms of forming tubes or other forming devices. Thus, the forming device may be variously shaped and proportioned, both as to length and cross section. The pressure control system is of considerable aid in maintaining uniformity of dimensions and structure of the shape being formed. By providing uniformity of pressure at the entrance end of the die or forming device, the invention tends to establish uniform delivery of the shape being formed from the discharge end of the die or forming device. These advantages are of especial importance where the material is at least in part solidified during passage through the forming device.

Although the provision of a lining of polytetrafluoroethylene is preferred, especially where the forming device takes the form of an elongated tube in which the thermoplastic material is solidified during passage therethrough, the invention is also applicable where such lining is not employed. Moreover, the lining need not necessarily take the form of a coating bonded to the interior surface of the forming tube, but may take the form of a separately formed lining sleeve such as indicated at 65 within the forming tube 17a of Figure 10.

Hereinafter certain examples are given illustrating the formation of elongated pieces according to the present invention from a variety of typical thermoplastic materials. However, before considering these examples it is pointed out that, in general, the equipment and method of the invention are applicable to thermoplastic materials of a wide variety of types, including those which have no true melting point but merely soften over a broad range of temperatures, and also those which have a relatively sharp melting point and are liquid in the softened or molten condition.

The very fact that the equipment and method of the invention are usable with such a broad range of different materials is in itself a distinct advantage of the present invention.

It is further pointed out that certain aspects of the invention are of especial advantage when employing thermoplastic materials such as the polyamides, having relatively sharp melting points and characterized by a high degree of fluidity in the molten condition. These materials are ordinarily much more difficult to utilize in forming and fabrication techniques; but notwithstanding the fact that these materials are liquid in the molten condition, a high degree of uniformity, both with respect to internal structure and external dimensions, is attainable when employing the control of the pressure at the input side of the forming device.

In a group of comparative operations employing different materials, a screw feed device having a screw of approximately 2" diameter was employed, and a forming tube internally lined with a coating of polytetrafluoroethylene and having an inside diameter of 1¼" was associated with the screw feed device. The temperature of the cooling jackets surrounding the forming tube was adjusted to effect substantial solidification of the piece during its passage through the forming tube. A pair of feed rolls, such as indicated at 31 and 32 in Figure 1 were employed, being driven at different constant speeds for different materials, as brought out more fully herebelow. In some cases the friction brake 26—27 was utilized and in other cases it was not, as will further appear. The screw feed device had a maximum output rate somewhat in excess of that corresponding to 6" per minute of formed rod delivered from forming tube (1¼" inside diameter).

With the foregoing equipment and operating conditions, each of the following listed materials was used, with certain variations of temperature, pressure and rate of operation, as indicated in the table just below.

| | Temp. of Softened Material Fed to Forming Tube (° F.) | Median Value of Pressure Established by Control System at Input End (p. s. i.) | Delivery Rate of Formed Rod (in./min.) |
|---|---|---|---|
| 1. Polyhexamethylene adipamide | 530 | 225 | 6 |
| 2. Polyhexamethylene sebacamide | 510 | 240 | 1½ |
| 3. Epsilon Caprolactam | 540 | 280 | 6 |
| 4. Interpolymer of adipic acid, sebacic acid and Epsilon aminocaproic acid | 390 | 250 | 1¼ |
| 5. Cellulose acetate butyrate | 425 | 270 | 6 |
| 6. Polymethyl methacrylate | 390 | 400 | 1½ |
| 7. Polyethylene | 390 | 350 | 1½ |
| 8. Polystyrene | 350 | 350 | 1¼ |

In all cases rod was continuously formed having substantially uniform internal structure, free from porosity, and was substantially uniform in external dimensions.

In Examples 1, 2, 4, 5 and 8 the driving motor for the screw feed device was of the variable speed type and the pressure control system employed conformed with that illustrated in Figure 8 and described above. In Examples 3, 6 and 7, the driving motor for the screw feed device was of the constant speed type and incorporated an adjustable magnetic clutch, the control system conforming with that shown in Figure 11 and described above.

It is further noted that in the case of materials listed in the table opposite numbers 1, 3, 5 and 6 some brake pressure was applied by means of the friction brake 26—27. With the other materials, however, no brake pressure was used. With respect to the operation of this friction brake, the following factors should be noted:

The general purpose of the brake is to assist the feed rolls 31—32 in retarding delivery of the formed rod from the forming tube in those cases where the maintenance of the desired delivery rate of the formed rod requires applying a force to the rod resisting its advancement. On the other hand, where the desired rate of delivery of the formed rod requires the imposition of a tension force on the rod by the feed rolls, no brake pressure would ordinarily be utilized. Similarly, in cases where the feed rolls act at times to apply a tension force and at times to resist the advancement of the formed rod, the application of a braking force would not ordinarily be needed.

The rate of delivery of formed rod from the forming tube and therefore also the rate of operation of the feed rolls 31—32 will vary in accordance with a number of factors, including the particular material being utilized to form the rod and also the diameter of the rod being formed. In general, increase in diameter of the rod being formed requires an increase in the braking pressure applied by the braking elements 26—27. Some of the characteristics of the particular material being used which influence the rate of delivery and also whether or not braking pressure is needed, include such characteristics as the coefficient of friction of the particular material against the interior surface of the forming tube whether or not the material tends to shrink on solidification, the extent of such shrinkage, thermal conductivity, heat transfer coefficient, latent heat of freezing, fluid viscosity, etc.

As will be appreciated, the temperature of feed of the material into the entrance end of the forming tube will in general depend upon the softening range or melting point of the particular material, appropriate ranges for the materials listed in the table above being given in the table below. The table below further indicates appropriate ranges of pressure within which the pressure control system may be adjusted.

| | Range of Temperature (° F.) | Range of Pressure (p. s. i.) |
|---|---|---|
| 1. Polyhexamethylene adipamide | 485-590 | 100-4,000 |
| 2. Polyhexamethylene sebacamide | 435-550 | 100-3,000 |
| 3. Epsilon Caprolactam | 450-575 | 150-3,000 |
| 4. Interpolymer of adipic acid, sebacic acid and epsilon aminocaproic acid | 330-450 | 100-3,000 |
| 5. Cellulose acetate butyrate | 330-470 | 100-3,000 |
| 6. Polymethyl methacrylate | 325-480 | 200-3,000 |
| 7. Polyethylene | 325-425 | 200-3,000 |
| 8. Polystyrene | 325-500 | 100-3,000 |

We claim:

1. Equipment for continuously forming elongated shapes from softened plastic material comprising a screw feed device for continuously advancing a stream of the softened plastic material under pressure, the screw feed device having variable control mechanism for regulating the speed of the screw, a hollow forming device through which said stream is forced by the feed device in contact with the interior of said forming device to impart the desired shape thereto, a connection between the screw device and the forming device having a passage for delivering said stream from the former to the latter, a pressure responsive element in said passage, and a control connection between the pressure responsive element and the control mechanism of the screw feed device acting to decrease the screw speed when the pressure in said passage exceeds a median value and to increase the screw speed when the pressure in said passage falls below said median value.

2. Equipment according to claim 1 in which the variable control mechanism for regulating the speed of the screw comprises a variable drive mechanism for the screw incorporating a clutch having adjustment means providing for variation of the torque transmissible therethrough, the control connection from the pressure responsive element being coupled with said clutch adjustment means.

3. Equipment according to claim 1 in which the variable control mechanism for regulating the speed of the screw comprises a variable drive mechanism for the screw incorporating a variable speed motor, the control connection from the pressure responsive element being coupled with said variable speed motor.

4. Equipment for continuously forming elongated shapes from softened thermoplastic material comprising a screw feed device for continuously advancing a stream of the softened plastic material under pressure, the screw feed device having variable control mechanism for regulating the speed of the screw, a forming device having a passage through which said stream is forced by the feed device in contact with the interior of said forming device, means for cooling the material to the point of solidification during its movement through the passage in the forming device, constant speed feed mechanism engaging the solidified shape beyond the forming device, a pressure responsive element exposed to the pressure of the stream of softened material in its passage from the screw feed device to the forming device, and a control connection between the pressure responsive element and the control mechanism of the screw feed device acting to decrease the screw speed when the pressure of the stream of plastic material being delivered to the forming device exceeds a median value and to increase the screw speed when said pressure falls below said median value.

5. Equipment according to claim 4 in which the variable control mechanism for regulating the speed of the screw comprises a drive system incorporating a clutch.

6. Equipment according to claim 4 in which the variable control mechanism for regulating the speed of the screw comprises a variable speed drive motor connected with the screw.

7. Equipment according to claim 4 in which the constant speed feed mechanism engaging the solidified shape beyond the forming device comprises a pair of rolls in frictional pressure engagement with the solidified shape.

8. Equipment according to claim 7 and further including a friction clamp brake engaging the solidified shape delivered from the forming device.

9. A method for continuously forming elongated shapes from softened thermoplastic material, comprising continuously feeding a stream of softened material under pressure into the inlet end of a forming device having open inlet and discharge ends, cooling the material to the point of solidification during passage thereof through the forming device in contact with the interior of said forming device, establishing and maintaining a substantially uniform rate of delivery of the solidified shape from the discharge end of said forming device, and establishing and maintaining a substantially uniform pressure of the softened material in the inlet end of the forming device.

10. In the formation of elongated shapes from polyamides of the kind which are liquid in the molten condition by the method of feeding liquid polyamide into the inlet end of a forming tube having open inlet and discharge ends and cooling the polyamide to the solidification point during its passage through the forming tube, in which method variations in rate of delivery of the solidified shape from the forming tube and variations in pressure of the liquid polyamide in the inlet end of the forming tube tend to occur; the steps of forceably establishing and maintaining a substantially uniform rate of delivery of the solidified shape out of the discharge end of the forming tube and establishing and maintaining a substantially uniform pressure of the liquid polyamide in the entrance end of the forming tube by controlling the feed of liquid polyamide into the inlet end of the forming tube.

11. A method according to claim 9 and further including the step of continuously annealing the solidified shape to relieve strains as it is delivered from the discharge end of the forming device.

12. Equipment according to claim 1 and further including heat transfer means surrounding the solidified piece beyond the forming device and adapted to continuously control the temperature of the piece as it is delivered from the forming device.

13. Equipment according to claim 12 in which the heat transfer means comprises an elongated loosely fitting tube through which the solidified piece passes and a temperature controlling jacket surrounding said tube and adapted to receive a heat transfer medium.

14. The method of claim 10 in which the forcible establishment and maintenance of said substantially uniform rate of delivery is effected by gripping the solidified shape beyond the discharge end of the forming tube between opposed friction gripping surfaces at least one of which is movable in the direction of the solidified shape and is driven at a uniform rate.

15. The method of claim 14 in which the rate of drive of the driven gripping surface is such as to tend to retard delivery of the solidified shape.

16. The method of claim 15 and further including applying a braking force to the solidified shape to assist the gripping surfaces in acting to retard the delivery of the solidified shape, and thereby assure the establishment and maintenance of a uniform rate of delivery of the solidified shape.

References Cited in the file of this patent
UNITED STATES PATENTS

| | | |
|---|---|---|
| 1,914,486 | Burton | June 20, 1933 |
| 2,156,895 | Godat | May 2, 1939 |
| 2,232,545 | Lum | Feb. 18, 1941 |
| 2,493,591 | Newton | Jan. 3, 1950 |
| 2,512,844 | Weber | June 27, 1950 |
| 2,540,146 | Stober | Feb. 6, 1951 |
| 2,568,332 | Genovese | Sept. 18, 1951 |
| 2,661,499 | James et al. | Dec. 6, 1953 |
| 2,685,115 | Hjulian | Aug. 3, 1954 |

Disclaimer 2,747,224.—*Robert B. Koch* and *Ralph E. James, Jr.*, Reading, Pa. METHOD AND APPARATUS FOR CONTINUOUSLY FORMING ELONGATED SHAPES FROM THERMOPLASTIC MATERIALS. Patent dated May 29, 1956. Disclaimer filed Apr. 26, 1965, by the assignee, *The Polymer Corporation*.

Hereby enters this disclaimer to claims 9, 10, 14 and 15 of said patent.
[*Official Gazette July 20, 1965.*]